No. 749,153. PATENTED JAN. 12, 1904.
S. L. BATCHELOR.
BICYCLE WITH ROWING ATTACHMENT.
APPLICATION FILED JUNE 3, 1901.
NO MODEL.
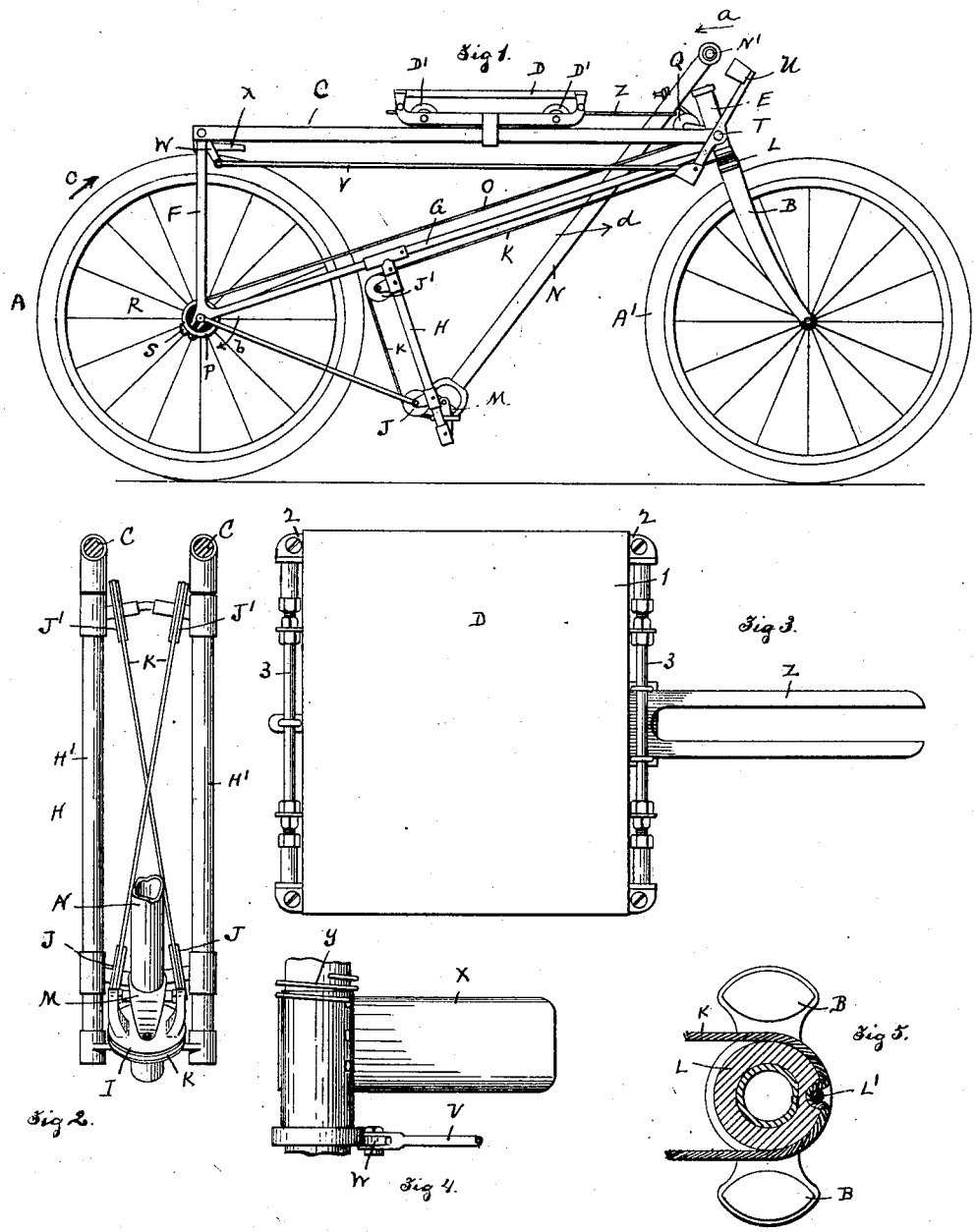

No. 749,153.

Patented January 12, 1904.

UNITED STATES PATENT OFFICE.

SANFORD L. BATCHELOR, OF GRAFTON, MASSACHUSETTS.

BICYCLE WITH ROWING ATTACHMENT.

SPECIFICATION forming part of Letters Patent No. 749,153, dated January 12, 1904.

Application filed June 3, 1901. Serial No. 62,878. (No model.)

*To all whom it may concern:*

Be it known that I, SANFORD L. BATCHELOR, a citizen of the United States, residing at Grafton, in the county of Worcester and Commonwealth of Massachusetts, have invented a new and useful Improvement in Bicycles with Rowing Attachments, of which the following is a specification, accompanied by drawings forming a part of the same, in which—

Figure 1 represents a side elevation of a bicycle embodying my invention. Fig. 2 is an enlarged view of a portion of the driving mechanism. Fig. 3 is a top view, on a larger scale, of the saddle. Fig. 4 is a top view of the brake, and Fig. 5 represents a portion in sectional view of the steering-head.

Similar reference letters and figures refer to similar parts in the different views.

My invention relates to an improvement in the driving mechanism of bicycles, by which power is applied by the rider to propel the bicycle by means of a driving mechanism requiring the same muscular exertion as that in rowing; and it consists in the construction and arrangement of parts, as hereinafter described, and set forth in the annexed claims.

Referring to the drawings, A A' denote the rear and front wheels of a bicycle, the former being journaled upon a spindle held in the usual manner in the framework of the body of the bicycle and the latter being similarly held in a fork B, pivotally connected with the framework of the bicycle in the usual and well-known manner of bicycles of the ordinary type.

The frame of the bicycle comprises a pair of parallel rods C C, forming a track for a sliding seat D, mounted upon trucks D' D' and adapted to run upon the track C. The forward end of the rails C C are rigidly attached to the steering-head E, and to the rear end of the rails C C is attached the rear fork F, which is connected with the steering-head by the diagonal brace-rods G. Attached to and extending below the brace-rods G is a bracket H, consisting of the paralled rods H' H', at the lower end of which is supported a pulley I and the guide-pulleys J J. An endless cord K is carried around the pulley I over the guide-wheels J J and over guide-wheels J' J' at the top of the bracket H, to and around a circular block L, attached to the upper end of the front fork B. The endless cord K is held from turning on the block L by means of a pin L' or other suitable means, so that the partial rotation of the pulley I will cause a corresponding rotation of the front fork B, enabling the direction of the front wheel A' to be changed in steering the bicycle. Connected with the pulley I by means of a universal joint M is a lever N, having a cross-bar N' at its upper end, forming the handles for the bicycle, by which a vibratory motion is given to the lever N by the rider seated upon the seat D. Attached near the upper end of the lever N is a cord O, which is connected with a pulley P, turning concentrically with the hub of the rear wheel A. The cord O passes around a pulley Q, so that when the lever N is vibrated in the direction of the arrow *a* the cord O will be unwound from the pulley P and when the handle N is vibrated in the direction of the arrow *d* the cord O will be wound up on the pulley P by means of a coiled spring R in the usual manner of devices of this class.

The pulley P carries a pawl S, engaging a ratchet (not shown) on the hub of the rear wheel, so that when the cord O is drawn off the pulley P it will be rotated in the direction of the arrow *b* and its motion imparted to the rear wheel in the direction of the arrow *c*. When the pulley P is rotated in the opposite direction by the spring R, the cord O will be wound up and the pawl S will slip over the teeth of the ratchet.

Pivoted upon the spindle T, held in the steering-head of the frame, are a pair of foot-rests, one of which is shown at U, Fig. 1. The other foot-rest, being a duplicate and immediately behind the foot-rest U, is not shown. The foot-rest U has its lower end pivotally connected by a link V with a lever W, attached to a rocking brake-shoe X, so that the rocking of the foot-rest U is made to carry the brake-shoe X into contact with the rear wheel A. The brake-shoe X is normally held out of contact with the rear wheel by means of a torsional spring Y, Fig. 4.

As the lever N is connected with the pulley

I by means of the universal joint M, it is capable of both a vibratory motion and also of a rotary motion about its own axis, by which a rotary motion is imparted to the pulley I and through the endless cord K to the fork B for the purpose of steering the machine. The lever N is guided in its vibratory motion by being held in a fork Z, projecting from the forward end of the sliding saddle D.

The operation of the machine is as follows: The rider, mounted upon the saddle D, seizes the handles N', with his feet placed in the foot-rests U. The lever N is drawn back, as indicated by the arrow $a$, and the cord O unwound from the pulley P, which imparts a rotary motion to the rear wheel A in the direction of the arrow $c$ by means of the pawl-and-ratchet connection between the pulley P and the hub of the rear wheel. As the motion of the lever N is reversed the cord O is wound up upon the pulley P by means of the coiled spring S, the saddle D having during the vibration of the lever N a sliding motion on the bars C. As a forward motion is given to the machine the front or steering wheel A' is guided by turning the lever N on its own axis and imparting a partial rotation to the pulley I through the universal joint M, the motion of the pulley I being communicated to the front fork B by means of the endless cord K. The saddle D consists of a strip of leather or other flexible material 1, attached at its ends to the bars 2 2, having their ends connected by the tie-rods 3, having right and left hand screw-threads and supported by the framework of the saddle. The tie-rods 3 are turned in order to separate the bars 2 2 and stretch the flexible seat 1.

What I claim as my invention, and desire to secure by Letters Patent, is—

1. In a bicycle, the combination with a framework of a rear wheel held in the framework, a front fork journaled in the framework, a wheel held in the front fork, a vibrating lever operatively connected with the back or driving wheel, a rotating pulley operatively connected with the front fork, and a universal-joint connection between said pulley and the vibrating lever, substantially as described.

2. In a bicycle, the combination with a framework of a rear wheel held in the framework, a front fork journaled in the framework, a wheel held in the front fork, a pulley held by said framework and operatively connected with the front fork, a lever pivoted at its lower end by a universal joint to said pulley, and a cord operatively connecting the upper end of said lever with the back wheel, substantially as described.

3. In a bicycle, the combination with a framework of a back or driving wheel held in the framework, a fork journaled in the framework, a front or steering wheel held in said fork, a pulley held in the framework, an endless cord operatively connecting said pulley and the front fork, a vibrating lever pivotally connected by a universal joint with said pulley, and means for operatively connecting said lever and the driving-wheel, substantially as described.

Dated this 31st day of May, 1901.

SANFORD L. BATCHELOR.

Witnesses:
FLORENCE C. COOK,
RUFUS B. FOWLER.